(12) United States Patent
Grieger

(10) Patent No.: US 11,433,945 B2
(45) Date of Patent: Sep. 6, 2022

(54) DEVICE FOR ARRANGING A PASSENGER RESTRAINT SYSTEM IN A VEHICLE

(71) Applicant: Aguti Produktentwicklung & Design GmbH, Langenargen (DE)

(72) Inventor: Andreas Grieger, Kressbronn (DE)

(73) Assignee: Aguti Produktentwicklung & Design GmbH, Langenargen (DE)

(*) Notice: Subject to any disclaimer, the term of this patent is extended or adjusted under 35 U.S.C. 154(b) by 319 days.

(21) Appl. No.: 16/671,244

(22) Filed: Nov. 1, 2019

(65) Prior Publication Data

US 2021/0129908 A1 May 6, 2021

(51) Int. Cl.
| | | |
|---|---|---|
| B62D 21/09 | (2006.01) | |
| B62D 25/20 | (2006.01) | |
| B60R 22/18 | (2006.01) | |
| B62D 27/04 | (2006.01) | |
| B60R 22/34 | (2006.01) | |
| B62D 31/02 | (2006.01) | |

(52) U.S. Cl.
CPC .............. *B62D 21/09* (2013.01); *B60R 22/18* (2013.01); *B62D 25/2009* (2013.01); *B62D 27/04* (2013.01); *B60R 22/34* (2013.01); *B62D 31/02* (2013.01)

(58) Field of Classification Search
CPC .... B62D 21/09; B62D 25/2009; B62D 27/04; B62D 31/02; B60R 22/18; B60R 22/34
See application file for complete search history.

(56) References Cited

U.S. PATENT DOCUMENTS

| | | |
|---|---|---|
| 5,868,452 A | 2/1999 | Grieger |
| 9,108,543 B1 | 8/2015 | Knapp |
| 2021/0078525 A1* | 3/2021 | Hitzfelder ............. B60R 22/105 |

FOREIGN PATENT DOCUMENTS

| | | | |
|---|---|---|---|
| DE | 93 08 942 U1 | 9/1993 | |
| DE | 43 33 463 A1 | 4/1995 | |
| DE | 298 00 290 U1 | 6/1999 | |
| DE | 10 2006 007 383 A1 | 9/2007 | |
| DE | 102017109466 A1 * | 11/2018 | ............. B62D 27/02 |
| EP | 0 765 252 B1 | 1/1999 | |

(Continued)

OTHER PUBLICATIONS

German Search Report (Application No. 10 2017 109 466.0) dated Jan. 19, 2018.

(Continued)

*Primary Examiner* — Lori L Lyjak
(74) *Attorney, Agent, or Firm* — Burr & Brown, PLLC

(57) ABSTRACT

A device for arranging a passenger restraint system in a vehicle to secure a passenger seated in the vehicle, including a support arrangement having a vertical support and a cross strut. When arranged on the vehicle, the vertical support is arranged upright on a vehicle floor. The device includes a fastening element, that when arranged on the vehicle, encompasses a rail of a vehicle chassis, at least laterally and beneath, such that, when the support arrangement is arranged on the vehicle, the fastening element bears against the support arrangement. The support arrangement is held on the vehicle chassis by the fastening element and, when the support arrangement is arranged on the vehicle, the fastening element passes progressively through the vehicle floor, starting from the rail of the vehicle chassis.

13 Claims, 2 Drawing Sheets

(56) References Cited

FOREIGN PATENT DOCUMENTS

| EP | 0 928 717 A1 | | 7/1999 | | |
|----|----|----|----|----|----|
| EP | 3238987 A1 | * | 11/2017 | ............. | B60R 22/18 |
| EP | 3398840 A1 | * | 11/2018 | ............. | B62D 27/02 |
| WO | 94/26553 A1 | | 11/1994 | | |

OTHER PUBLICATIONS

Extended European Search Report (Application No. 18169200.5) dated Oct. 9, 2018.

* cited by examiner

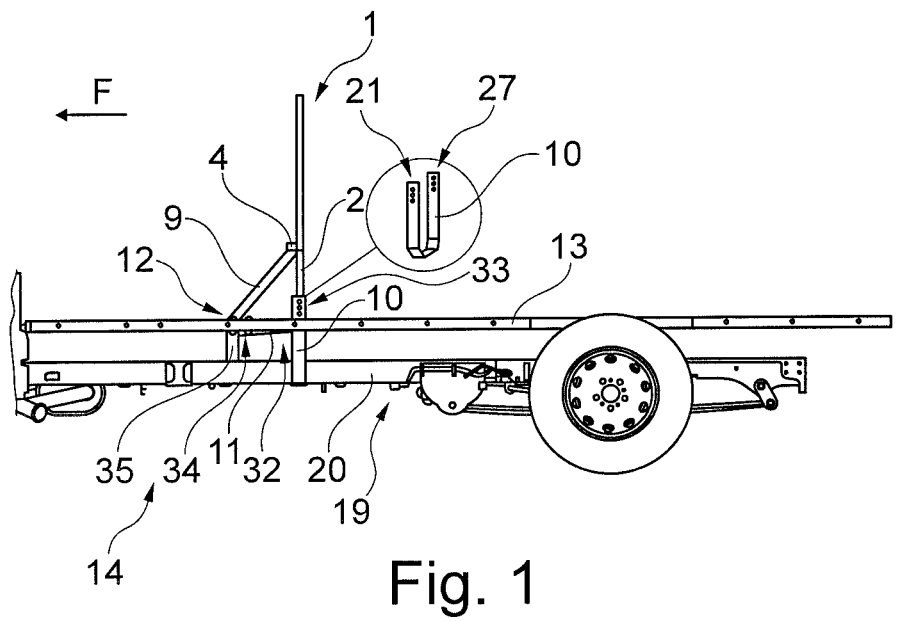
Fig. 1
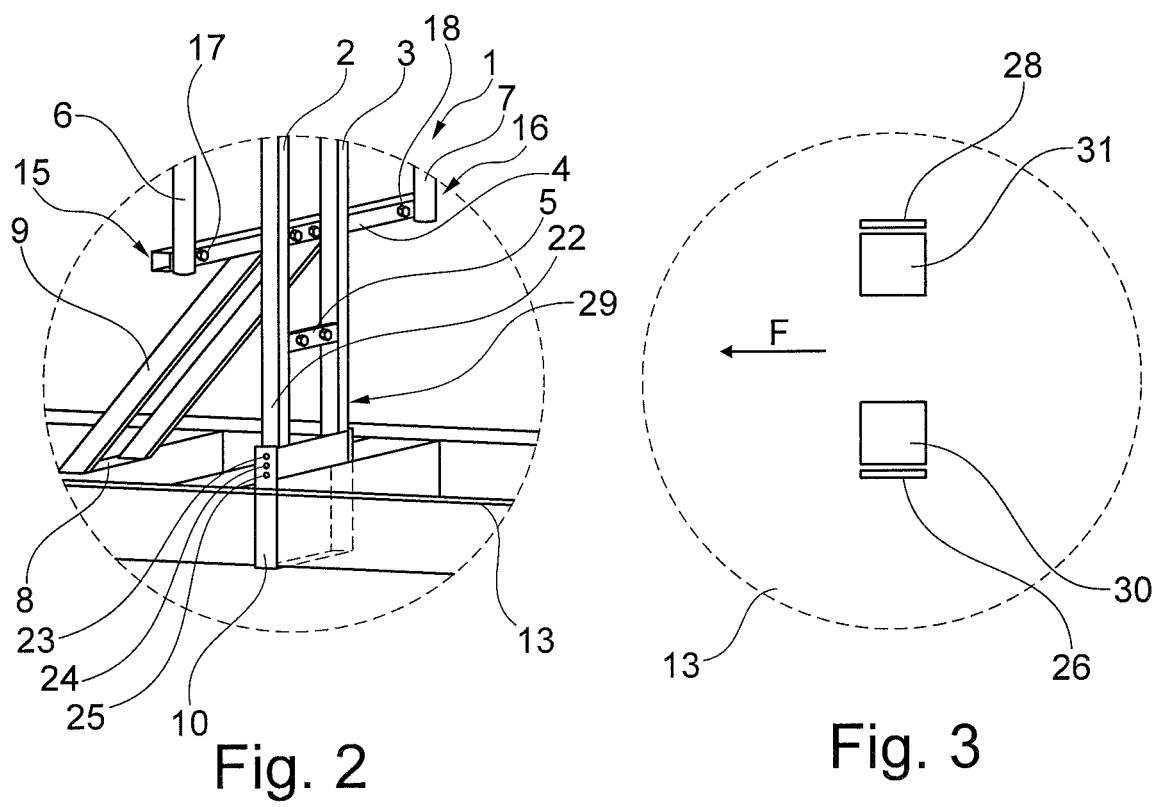
Fig. 2
Fig. 3

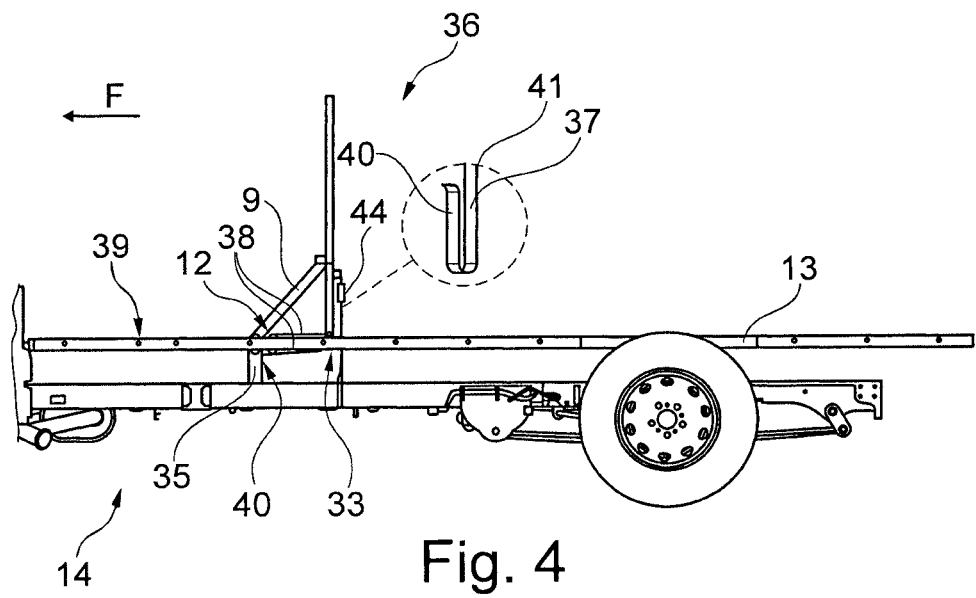
Fig. 4
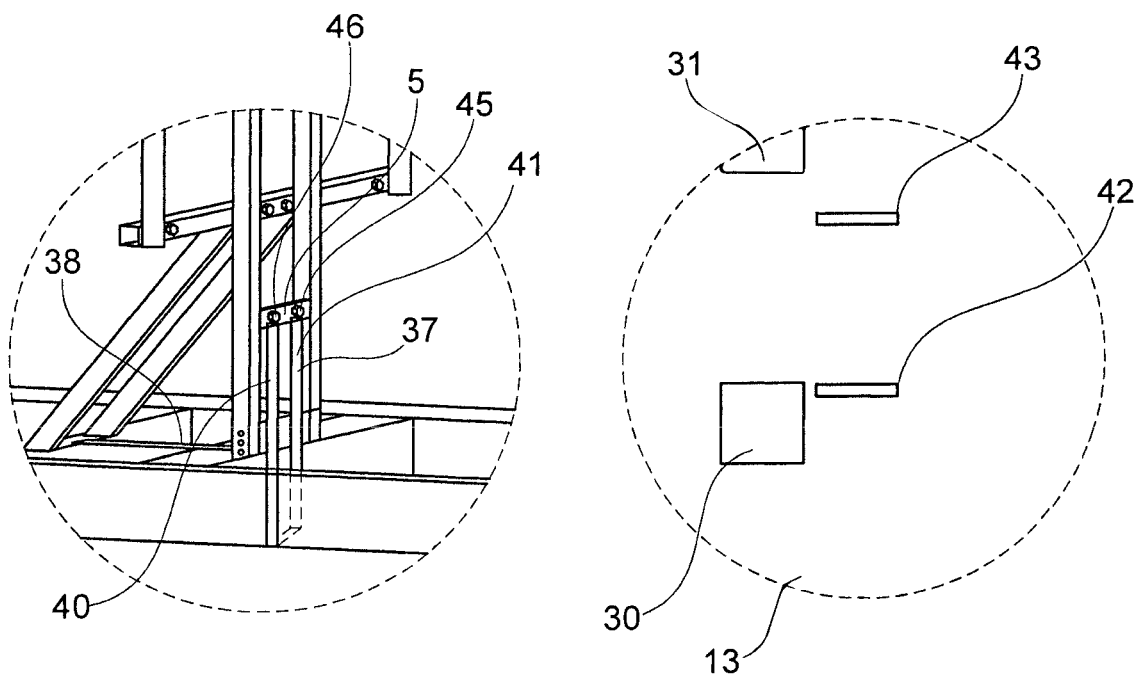
Fig. 5
Fig. 6

DEVICE FOR ARRANGING A PASSENGER RESTRAINT SYSTEM IN A VEHICLE

FIELD OF THE INVENTION

The present invention relates to a device for arranging a passenger restraint system in a vehicle.

BACKGROUND OF THE INVENTION

Devices for arranging a passenger restraint system in a means of transport are known, for example, for attaching a safety belt arrangement for securing passengers, and components of an associated passenger seat, in the means of transport.

In means of transport such as vehicles, for example, passenger cars, minibuses, motor homes or camping vans, such devices are provided as a structural unit for retrofitting in vehicles, subsequent to the manufacture of the vehicle. The device, with the passenger restraint system present thereon, must be designed for maximum load situations occurring in the vehicle, which, in particular, may occur in connection with road-traffic accident scenarios.

In the design of the device there is a need to fulfill, in particular, safety or stability criteria that are required, for example, for approval of the device, or of the vehicle. In this case, realizing or producing the device in an inexpensive and economically advantageous manner presents a particular challenge.

SUMMARY OF THE INVENTION

The object of the present invention is to provide a device of the type described in the introduction, or a passenger seat arrangement for a vehicle, in a technically and economically advantageous manner. In particular, it is intended that stability criteria can be fulfilled in a manner that is reliable and advantageous in respect of production engineering.

The present invention is based on a device for arranging a passenger restraint system in a vehicle, in order, by the passenger restraint system, to secure a passenger seated in the vehicle, the device comprising a support arrangement having at least one vertical support and at least one cross strut and, when the support arrangement has been arranged on the vehicle, the vertical support being arranged upright on a vehicle floor of the vehicle. The device is advantageously realized as a belt frame for a vehicle seat or a vehicle seat bench.

Advantageously, the cross strut is realized as an elongate cross strut. For example, the cross strut is accommodated on the vertical support and oriented at an angle in relation to the vertical support. The support arrangement advantageously comprises two, in particular, three, vertical supports, the vertical supports being, for example, spaced apart from each other. Preferably, the cross strut, in particular, aligned horizontally, connects the plurality of vertical supports to each other. The vertical supports are advantageously spaced apart from each other laterally, or sidewise, or horizontally. If necessary, in the foot region of the vertical supports, a connection of the vertical supports can be connected to each other, e.g. by a cross strut, via which, for example, a fixing to the floor region of the vehicle, e.g. to the vehicle floor and/or on the vehicle structure, can be established.

A cross strut is preferably realized so as to be continuous, and preferably projects horizontally, or laterally, for example, on both sides or on one side, over the one vertical support or the plurality of vertical supports. Accordingly, the cross strut is normally longer than a footprint dimension, or a spacing, in particular, a lateral spacing, of, in particular, two vertical supports.

Such a support arrangement is realized, in particular, as a mounting device in the manner of a frame-type support, comprising clear spaces that are framed by profiles, in particular, elongate profiles, that are connected to each other and oriented parallel to and at an angle to each other. The profiles are preferably composed of a metallic material.

For example, the support arrangement also comprises attaching mechanisms for attaching the support arrangement to a vehicle floor of the vehicle. The support arrangement is preferably designed and realized to be fastened, in the vehicle, or in a motor vehicle, to a floor portion of the vehicle. Preferably, the attaching mechanism is realized to attach the support arrangement to the vehicle floor in a separable or inseparable manner. For example, the support arrangement, when having been arranged on the vehicle, is screw-connected, riveted and/or welded to the vehicle floor via the attaching mechanism. The attaching mechanisms of the support arrangement, for attaching to the vehicle floor of the vehicle, are realized, for example, at the foot region of the support arrangement.

The vehicle is realized, for example, as an automobile, as a bus, as a motor home or as a camping van. The support arrangement advantageously forms a basic structure for a seat arrangement in the vehicle, for example, for a vehicle seat arrangement.

A passenger restraint system is advantageously realized as a safety belt arrangement, e.g. as a multi-point belt safety system or as a three-point safety system. Preferably, a component of the passenger restraint system can be attached to the support arrangement. Such a component is, for example, a belt retractor, a belt deflection arrangement for changing the direction of the belt guided past the same, a fixing of a belt end and/or a belt buckle at which an insert part can be separably latched-in, by which the belt can be drawn out as a loop.

The proposed support arrangement must be of such a structural, or mechanical, design that it can oppose with sufficient resistance a maximally tolerable, or possible, load, in particular, in the case of dynamic load conditions, i.e. can take up and transfer corresponding forces and moments.

This is a prerequisite for maintaining the safety of a passenger that can be secured by a safety belt arrangement, the safety belt arrangement being accommodated on the support arrangement fixed in the vehicle, e.g. together with elements of a corresponding passenger seat. Accordingly, the device is preferably designed to form an inner support structure of a passenger seat fixedly installed in the vehicle.

For a comparatively greater stability of the device, e.g. for extending the possibility of application to a passenger seat having two or more seating places, the support arrangement may comprise, for example, exactly two or exactly three parallel vertical supports, e.g. spaced apart from each other, the vertical supports preferably being identical in structure. Both vertical supports are preferably connected to a horizontally arranged cross strut.

In the case of a typical support arrangement according to the present invention, having two or three vertical supports that can be set in an upright position in the vehicle, and having a horizontally oriented cross strut, the length of the vertical supports, or the height of the support arrangement in the mounted state, is approximately 1.1 meters to approximately 1.3 meters, the vertical supports, in particular, the two outer vertical supports, being laterally spaced apart from each other by a distance of, for example, approximately 0.3 to 0.4 meters. A length of the cross strut is preferably approximately 0.7 to 0.9 meters.

The vertical support and/or the cross strut are/is preferably realized as a hollow profile. In cross section, the hollow profile is typically rectangular or square, but it is also conceivable for the hollow profile to be round or elliptical in cross section. A typical length and/or width dimension, or lateral dimension, of the cross section of the hollow profile is approximately 20 to 40 millimeters. A wall thickness of the hollow profile is normally in a single-digit millimeter range. It is also conceivable for the hollow profile to be a multiple hollow profile.

Furthermore, it is conceivable for the hollow profile, in particular, the vertical support, to have a material recess, e.g. a slot, realized as a predetermined bending point for when the arranged device is subjected to load, e.g. in the event of crashing of the vehicle. A plastic deformation behavior of the vertical support, when subjected to load, can thus be influenced, in particular, is predefinable. Advantageously, the recess on the vertical support extends, in particular, in the horizontal direction, over a front side of the vertical support and over at least one lateral region of the vertical support that adjoins the front side. In particular, the material recess extends in portions on the front side and on two opposing lateral regions of the vertical support that laterally adjoin the front side. The front side is to be understood with regard to the support arrangement in an attached state in the vehicle.

A vehicle seat, or passenger seat, that can be formed with the device accordingly has a seat structure having a seat surface that is located on the front side of the support structure, or on the front side of the vertical support and/or on a front side of the cross strut, the front side of the vertical support and the front side of the cross strut advantageously being oriented in the direction of travel.

When the device has been installed in the vehicle, the relevant load direction normally corresponds to a seating direction of the secured passenger, or the direction of travel of the vehicle. In a vehicle, a maximum load occurs, for example, if the travelling vehicle collides with an obstacle, in a crash. Owing to the decelerated mass of the passenger seated and secured in the vehicle, a tensile force acting in a jolting manner, or a moment resulting therefrom, acts on the support arrangement in the load direction, or in the direction of travel.

An essential aspect of the present invention then consists in that the device comprises a fastening element, the fastening element, when having been arranged on the vehicle, encompassing a rail, in particular, a longitudinal rail, of a vehicle chassis of the vehicle, at least laterally and beneath, such that, when the support arrangement has been arranged on the vehicle, the fastening element is fastened so as to bear against the support arrangement, in particular, against the vertical support and/or against the cross strut, the support arrangement, in particular, the vertical support, being held on the vehicle chassis of the vehicle by the fastening element and, when the support arrangement has been arranged on the vehicle, the fastening element going progressively through the vehicle floor of the vehicle, starting from the rail of the vehicle chassis. As a result, the device can be produced relatively inexpensively, and can be mounted relatively easily.

Preferably, the device is present and can be arranged on the vehicle in such a manner that, for the purpose of fastening the support arrangement to the vehicle chassis, in particular, the vertical support to the vehicle chassis, in particular, to the longitudinal rail of the vehicle chassis, only the fastening element passes through the vehicle floor. The fastening element is advantageously a single piece, in particular, produced from a single material. Preferably, the fastening element does not have any dividing point. For example, a contour of the fastening element in the region in which it passes through the floor, in particular, an outer contour of the fastening element in the region in which it passes through the floor, corresponds to a contour of the fastening element in the region in which it encompasses or wraps around the rail of the vehicle chassis, in particular, to an outer contour of the fastening element. The contour of the fastening element, in particular, the outer contour of the fastening element, advantageously extends over a preponderant distance, in particular, continuously along a longitudinal extent of the fastening element. Preferably, the fastening element twice passes progressively through the vehicle floor, in particular, along its longitudinal extent. For example, the fastening element passes through the vehicle floor by pass-through regions of the fastening element. It is conceivable for the two pass-through regions of the fastening element to be realized, spaced apart from each other, along the longitudinal axis of the fastening element. In an intermediate region of the fastening element, between the two pass-through regions of the fastening element, along the longitudinal axis, the fastening element advantageously wraps around the rail of the vehicle chassis.

Preferably, when the support arrangement has been arranged on the vehicle, the support arrangement, in particular, the vertical support, is fastened, in particular, fixed, e.g. screw-connected, adhesive-bonded, welded and/or riveted, to the vehicle floor. Advantageously, the attaching mechanism by which the support arrangement, when having been arranged in the vehicle, is fastened to the vehicle floor, do not, in particular, do not fully, pass through or penetrate the vehicle floor of the vehicle. Preferably, the attaching mechanisms are realized in such a manner that the support arrangement is positioned in the vehicle floor, in particular, solely against slippage. Advantageously, the attaching mechanisms are not designed to hold the support arrangement, for example, on the vehicle floor and/or on the vehicle chassis, in the event of a crash.

It also proves to be advantageous that the fastening element is realized in the manner of a band. The fastening element is thus realized so as to be comparatively inexpensive and flexible.

The fastening element is in the form of, for example, a strip. For example, the fastening element is realized as a, in particular, flexible, metal strip and/or as a, in particular, flexible, metal band. It is also conceivable for the fastening element to be a belt band, a pull band and/or a woven fabric band. Advantageously, the fastening element is realized to take up and transfer forces that act on the fastening element in the direction of the longitudinal extent. For example, the fastening element is designed to take up tensile forces.

Preferably, the fastening element is a flexible tensile element, e.g. a pliable tensile element. For example, the fastening element is realized in the manner of a cloth, e.g. as a cloth, in the manner of a mesh, e.g. as a mesh, and/or in the manner of a woven fabric. The fastening element has, for example, a triangular shape or a rhomboid shape and/or a trapezoidal shape. The fastening element is produced, for example, from metal, from fabric and/or plastic.

For example, when the support arrangement has been arranged on the vehicle, the fastening element bears flatly against the vertical support and/or the cross strut, in particular, along a longitudinal extent of the fastening element.

It is also conceivable for the fastening element to be realized in the manner of a tube, e.g. as a bent tube. The fastening element may be, for example, a tube having a round or oval cross section. It is also conceivable for the tube to be a square tube, or square steel bar.

For example, the fastening element, when having been arranged, engages in a cavity of the vertical support, in particular, from underneath. When having been arranged on the support structure, an end region of the fastening element runs, for example, parallel to a longitudinal axis of the vertical support. In particular, when having been arranged on the support structure, the fastening element, with the longitudinal axis, in particular, with a longitudinal axis of the end region, is parallel to the longitudinal axis of the vertical support.

In an advantageous design of the device, the fastening element, when having been arranged on the vehicle, forms a U shape. The fastening element thereby has a shape that is advantageous for encompassing the rail of the vehicle chassis. For example, the U-shaped fastening element has a pass-through region at an open end of the U, in particular, the fastening element has a respective pass-through region at both open ends of the U. It is also conceivable for the fastening element, when having been arranged on the vehicle, to be realized in the shape of a V and to have, in particular, exactly one bend and/or one bend region or exactly one curvature. For example, the curvature is circular or elliptical in form.

Advantageously, the fastening element, when having been arranged on the vehicle, comprises exactly two bends and/or two bend regions, e.g. exactly three bends and/or exactly three bend regions, in particular, exactly four bends and/or exactly four bend regions. The bends and/or the bend regions in this case advantageously have a bend angle of greater than 75°, in particular, of greater than or equal to 90°.

It additionally proves to be advantageous that the fastening element, when having been arranged on the vehicle, is in the form of a loop.

Advantageously, when the support arrangement has been arranged on the vehicle, the fastening element encompasses the longitudinal rail of the vehicle chassis, at least laterally and beneath, in the manner of a loop. It is also conceivable, when the support arrangement has been arranged on the vehicle, for the fastening element to encompass the longitudinal rail of the vehicle chassis, in particular, completely, for example, in the form of a loop or in the form of a ring. For example, the fastening element encompasses the rail of the vehicle chassis laterally, in particular, on both sides, and above and beneath.

It is also conceivable that, when the support arrangement has been arranged on the vehicle, the fastening element is in the form of a lasso. For example, the fastening element is in the form of a lasso and, when in the arranged state, encompasses, e.g. with a loop of the lasso, the longitudinal rail of the vehicle chassis. Further, it is conceivable, when the support arrangement has been arranged on the vehicle, for the fastening element to be present on the support arrangement and on the vehicle chassis in such a manner that, in a load situation, for example, in the event of crashing of the vehicle, a loop of the fastening element, e.g. of the lasso, that encompasses the longitudinal rail of the vehicle chassis tightens, or pulls tight, or contracts.

It also proves advantageous, in particular, when the support arrangement has been arranged on the vehicle, that the fastening element is fastened by one end, in particular by two ends, to the vertical support and/or to the cross strut of the support arrangement.

Advantageously, the two ends of the fastening element are spaced apart from each other along a longitudinal axis of the fastening element, and opposite each other on the fastening element. Preferably, when the support arrangement has been arranged on the vehicle, the fastening element is fixed, in particular, inseparably, to the vertical support and/or to the cross strut. The fastening element is, for example, screw-connected, riveted, adhesive-bonded and/or welded to the vertical support and/or to the cross strut.

Moreover, it proves advantageous, in particular, when the support arrangement has been arranged on the vehicle, that the fastening element is arranged on a lateral face or on two lateral faces of the vertical support, the lateral faces of the vertical support, when the support arrangement has been arranged on the vehicle, extending parallel to a direction of travel of the vehicle. The two lateral faces of the vertical support on which the fastening element is arranged when the support arrangement has been arranged on the vehicle are advantageously spaced apart from each other, and are opposite each other on the vertical support.

In an advantageous modification of the device, the support arrangement has two or more vertical supports and, in particular, when the support arrangement has been arranged on the vehicle, the fastening element is arranged by a first end on a first vertical support and by a second end on a second vertical support.

Preferably, when the support arrangement is in the arranged state, the fastening element is fastened, by one end respectively, to an outer vertical support of the support arrangement. For example, the fastening element, when having been arranged on the support arrangement, is fastened to two outer vertical supports of the support arrangement that are spaced apart from each other.

It is further proposed that, when the support arrangement has been arranged on the vehicle, the fastening element is arranged with one end on the cross strut of the support arrangement, the cross strut, as viewed in the vertical direction, being fastened to one or more vertical supports, beneath a mounting point of the support arrangement, perpendicularly in relation to an extent of the vehicle floor of the vehicle, the mounting point being provided for arranging a component of the passenger restraint system. As a result, there is advantageously a point of application of force of the support arrangement at the fastening element. It is also conceivable for the fastening element, as viewed in the direction of travel, to be arranged behind means for attaching the support arrangement to the vehicle. A rotational movement of the support arrangement in the event of a crash is thereby reduced.

Moreover, it proves advantageous that there are tensioning mechanisms, for tensioning the support arrangement to the vehicle chassis, via the fastening element, when the support arrangement has been arranged on the vehicle.

Advantageously, the fastening element comprises the tensioning mechanisms. A tensioning mechanism is realized, for example, as a belt tensioner. Advantageously, the device is such that, when the device has been arranged on the vehicle, the support arrangement is tightened, vertically on the vehicle floor, downward onto the vehicle floor, in a direction perpendicular to an extent of the vehicle floor, in the direction of the vehicle chassis, by the tensioning mechanism, and, in particular, by the fastening element.

It additionally proves advantageous that the support arrangement, starting from a cross strut and/or a vertical support, has a support foot extending forward and downward, e.g. obliquely forward and downward, the support foot being realized, for example, as a mount-on unit, the support foot being designed to support the support arrangement, when having been arranged in the vehicle, forward and downward on the vehicle floor, the support arrangement having a fastening member that, when the device has been arranged on the vehicle, connects the support foot to the remaining support arrangement in the region of the vehicle floor. The fastening member prevents a horizontal distance of the support foot from the vertical support from being altered, parallel to the vehicle floor, in particular, in the event of a crash. The fastening member advantageously closes a triangle of forces, between support foot, vertical support and fastening member.

Advantageously, the fastening member is in the form of a band.

As a result of the fastening member being realized in the manner of a band, e.g. as a steel band and/or as a belt band, the device can be produced comparatively inexpensively and with a comparatively low weight. Moreover, as a result of being realized in the manner of a band, the fastening member is comparatively flexible, and mounting, or attaching, is thereby facilitated, or improved.

An advantageous modification of the invention comprises a vehicle having a device for arranging a passenger restraint system, and/or having a vehicle seat, in particular, having a device for arranging a passenger restraint system, the vehicle floor of the vehicle having a slot-type opening, through which the fastening element and/or the fastening member passes when in the arranged state. An insulation of the vehicle floor is thereby optimized.

Advantageously, the fastening element, when having been arranged on the vehicle, is passed through the opening. Preferably, the vehicle floor of the vehicle comprises two openings that are spaced apart from each other, the fastening element passing through both openings. The openings are advantageously spaced apart from each other in a direction perpendicular to a longitudinal axis of the longitudinal rail of the vehicle chassis. It is also conceivable for the fastening element on the vehicle to pass with both ends through a single opening of the vehicle floor. Advantageously, when in the arranged state, the fastening element closes, in particular completely, the opening in the vehicle floor through which it passes.

It is furthermore conceivable that the vehicle has a further, in particular, slot-type, opening for the fastening member. Advantageously, when in the arranged state, the fastening member passes through the vehicle floor. Advantageously, when in the arranged state, the fastening member closes, in particular, completely, the further opening of the vehicle floor through which it passes.

BRIEF DESCRIPTION OF THE DRAWINGS

Several exemplary embodiments are explained in greater detail on the basis of the schematic drawings that follow, further details and advantages being specified.

FIG. 1 a lateral partial view of a vehicle basic frame of a vehicle, having a vehicle chassis, a vehicle floor, and a support arrangement according to the present invention arranged on the vehicle;

FIG. 2 an oblique, lateral, perspective partial view, from behind and above, of the support arrangement from FIG. 1 arranged on the vehicle, with a transparently represented vehicle floor;

FIG. 3 a partial plan view of a vehicle floor without arranged support arrangement, the vehicle floor being realized for arranging a support arrangement according to FIG. 1;

FIG. 4 a lateral partial view of the vehicle basic frame of a vehicle, having a vehicle chassis, a vehicle floor and a further variant of a support arrangement arranged on the vehicle;

FIG. 5 an oblique, lateral, perspective partial view, from behind and above, of the arranged support arrangement from FIG. 4, with a transparently represented vehicle floor; and FIG. 6 a partial plan view of a vehicle floor without arranged support arrangement, the vehicle floor being realized for arranging a support arrangement according to FIG. 4.

DETAILED DESCRIPTION OF THE INVENTION

A support arrangement 1 comprises, for example, inter alia, two vertical supports 2, 3, a first cross strut 4, a second cross strut 5, two connection elements 6, 7, an attaching mechanism 8, a support foot 9, a fastening element 10, and a fastening member 11 (FIGS. 1, 2, 4, 5).

When having been arranged on the support arrangement 1, longitudinal axes of the two vertical supports 2, 3 are oriented vertically. The vertical supports 2, 3 are spaced apart from each other and, for example, next to and parallel to each other. Attaching mechanism 8 are provided in the foot region 12 of the support foot 9, in order to fasten to a vehicle floor 13, for example to screw to the vehicle floor 13 of a vehicle 14, the support foot 9 when in the arranged state. The cross struts 4, 5 are advantageously perpendicular to the vertical supports 2, 3, and preferably connected, in particular, inseparably, to each of the vertical support 2, 3. For example, the cross struts 4, 5 are welded to the vertical supports 2, 3, or are screw-connected and/or riveted to the vertical supports 2, 3. The first cross strut 4 is advantageously fastened to the vertical supports 2, 3 approximately at the level of a seat surface of a vehicle seat, the vehicle seat comprising the support arrangement 1. In particular, the first cross strut 4 is realized, starting from the vehicle floor 13, upward in the vertical direction, at the level of one third of a length of the vertical supports 2, 3.

The connection elements 6, 7 are in the form of, for example, a band, e.g. a steel band. The connection elements 7, 8 connect the first cross strut 5, for example, to a further cross strut (not shown) in the head region of the support arrangement 1. The connection elements 6, 7 are oriented, for example, parallel to the vertical supports 2, 3 and extend, for example, in the vertical direction.

Furthermore, attaching elements, in the form of a fastening screw 17, 18, are arranged at ends 15, 16 of the first cross strut 4. When the support arrangement 1 has been arranged on the vehicle seat, a safety component of a passenger restraint system, e.g. a belt buckle (not represented), is fastened by the fastening screws 17, 18.

The vehicle 14 comprises, for example, a vehicle chassis 19, having a longitudinal rail 20, on which the vehicle floor 13 is arranged, upward in a vertical direction at a distance from the longitudinal rail.

When having been arranged on the vehicle 14, the support arrangement 1, with the vertical supports 2, 3 and the support foot 9, is upright on the vehicle floor 13, and, for example, is connected, for example, screw-connected, to the vehicle floor 13, in particular, for the purpose of positioning the support arrangement 1 on the vehicle floor 13, for example in respect of horizontal slippage. If necessary, the vertical supports 2, 3 of the support arrangement 1 are not connected, in particular, not screw-connected to the vehicle floor 13.

When the support arrangement 1 has been arranged on the vehicle 14, the fastening element 10 is arranged, for example, with a first end 21 bearing against an outer side 22 of the vertical support 2, and fixedly, in particular, inseparably, connected to the vertical support 2 via mounting elements 23-25, for example, a screw and/or a rivet. Starting from the first end 21, the fastening element 10 extends downward, in particular, in the vertical direction, in particular, progressively and continuously, along its longitudinal axis, and in so doing passes through the vehicle floor 13 in the region of an opening 26. The fastening element 10 then encompasses the longitudinal rail 20 of the vehicle chassis 19, for example, in a U-shaped manner, laterally on both sides of the longitudinal rail 20 and beneath the underside of the longitudinal rail 20. Further, by a second end 27 the fastening element 10 passes, in particular, progressively and continuously, extending upward along the longitudinal axis, in particular, extending upward in the vertical direction, through the vehicle floor 13 in the region of a further opening 28. The second end 27 of the fastening element 10, when having been arranged on the vehicle 14 and on the support arrangement 1, is fixedly connected to an outer side 29 of the vertical support 3, in particular, inseparably connected to the vertical support 3. The fastening element 10 is thus advantageously a single piece.

In FIG. 3, the vehicle floor 13 is represented in a partial view from above. Shown is a so-called footprint 30, 31 for the vertical supports 2, 3 of the support arrangement 1. The footprints 30, 31 form the surfaces on the vehicle floor 13 on which the vertical supports 2, 3 stand upright when having been arranged on the vehicle floor 13. Additionally shown in FIG. 3 are the openings 26, 28, advantageously realized in the manner of a slot, or in the form of a slot. It is thereby possible to guide, or push the fastening element 10, along its longitudinal axis, through the vehicle floor 13, the openings 26, 28 advantageously closely encompassing the fastening element 10, when the fastening element 10 has been arranged on the vehicle, such that a thermal insulation of the vehicle floor 13 is comparatively increased. If the fastening element 10 is such that it is fastened to the outer sides 22, 29 of the support arrangement 1, the openings 26, 28 are advantageously laterally offset in relation to the footprints 30, 31 on the vehicle floor 13, in a plane of the vehicle floor 13 perpendicular to a direction of travel F of the vehicle 14 (FIG. 3).

A fastening member 11, for example, is provided in order to close a triangle of forces between the support foot 9, the vertical supports 2, 3 and the vehicle floor 13 (FIG. 1). The fastening member 11, for example, by a first end 32 at a foot region 33 of the vertical supports 2, 3, is connected, in particular, inseparably, to the support arrangement 1. Starting from the first end 32, the fastening member 11, when having been arranged on the vehicle 14, extends in the direction of travel F, along the vehicle floor 13. It is conceivable for the fastening member 11 to be supported on or bear against the vehicle floor 13. As represented in FIG. 1, however, the fastening member 11 may also pass through the vehicle floor 13, in order to extend, beneath the vehicle floor 13, in the direction of travel F, along the vehicle floor 13. By a second end 34, the fastening member 11 is connected, in particular, inseparably, to the support foot 9, in the foot region 12 of the support foot 9.

In the foot region 12 of the support foot 9 the vehicle floor 13 is supported, for example, by a support member 35, on the vehicle chassis 19, or on the longitudinal rail 20 of the vehicle 14. Compressive forces that are present, in particular, in the event of a crash, can thereby be dissipated, starting from the support foot 9, via the vehicle floor 13 and the support member 35, to the vehicle chassis 19. The fastening member 11 may be directly connected to the support foot 9, or, for example, indirectly, via the support member 35. It is conceivable for the support foot 9 to be connected to the support member 35, in particular inseparably, when in the arranged state.

A further support arrangement 36 is shown on the vehicle 14 in FIGS. 4 to 6. The support arrangement 36 differs from the support arrangement 1 in FIGS. 1 to 3 in that the fastening element 37 and the fastening member 38 of the support arrangement 36 differ from the fastening element 10 and from the fastening member 11 of the support arrangement 1.

In the case of the embodiment according to the support arrangement 1, the fastening member 11 extends, along its longitudinal axis, in particular, continuously starting from a fastening point on the vertical support 2, 3, first passing downward through the vehicle floor 13 and then beneath the vehicle floor 13, along the vehicle floor 13 in the direction of travel F, to the support member 35, to which the fastening member 11 is fastened, by a second end 34. The fastening member 38 of the support arrangement 36, on the other hand, extends, for example, starting from the vertical supports 2, 3, above the vehicle floor 13, along an upper side 39 of the vehicle floor 13, to a foot region 12 of the foot support 9. Furthermore, it is conceivable for the fastening member 38 to be fastened, by a first end 40, to the support member 35 and to extend, along its longitudinal axis, contrary to the direction of travel F, beneath the vehicle floor 13, in the direction of the vertical supports 2, 3 of the support arrangement 36. Further, at the foot region 33 of the vertical supports 2, 3, the fastening member 38 passes through the vehicle floor 13, in particular, upward in the vertical direction, advantageously progressively. Then, in the foot region 33 of the vertical supports 2, 3, the fastening member 38 encompasses a deflection means of the support arrangement 36, as a result of which it is deflected in the direction of travel F. It consequently extends, in the direction of travel F, along the upper side 39 of the vehicle floor 13, to the support member 35, to which the fastening member 11 is fastened, by the second end 34 (FIGS. 4, 5).

The fastening element 37 of the support arrangement 36 is fastened 36, by both of its ends 40, 41, to the second cross strut 5 of the support arrangement 36. Starting from the second cross strut 5, the fastening element 37 extends, in a manner similar to the fastening element 37, through the vehicle floor 13, around the longitudinal rail 20 of the vehicle chassis 19, back through the vehicle floor 13, to the cross strut 5. The fastening element 37 can thereby be arranged on the support arrangement 36, behind the vertical supports 2, 3 of the support arrangement 36. Accordingly, the openings 42, 43 of the vehicle floor 13, for the fastening element 37 of the support arrangement 36, are realized behind the footprints 30, 31 on the vehicle floor 13, relative to the direction of travel F (FIG. 6).

In addition, the support arrangement 36, or the fastening element 37, may have a tensioning mechanism 44. The tensioning mechanism 44 is realized, for example, to reduce a length of the fastening element 37 along its course between fastening points 45, 46 on the cross strut 5.

LIST OF REFERENCES 1 support arrangement
2, 3 vertical support
4, 5 cross strut 6, 7 connection element
8 attaching mechanism
9 support foot
10 fastening element
11 fastening member
12 foot region
13 vehicle floor 1
14 vehicle
15, 16 end
17, 18 fastening screw
19 vehicle chassis
20 longitudinal rail
21, 27 end
22 outer side
23-25 mounting element
26, 28 opening
29 outer side
30, 31 footprint
32, 34 end
33 foot region
35 support member
36 support arrangement
37 fastening element
38 fastening member
39 upper side
40, 41 end
42, 43 opening
44 tensioning mechanism
45, 46 fastening point

The invention claimed is:

1. A device for arranging a passenger restraint system in a vehicle to secure a passenger seated in a vehicle seat of the vehicle, the device comprising:
   a support arrangement having a vertical support and a cross strut; and
   a fastening element,
   wherein when the fastening element is arranged on the vehicle, the fastening element encompasses a rail of a vehicle chassis of the vehicle, at least laterally and beneath, such that, when the support arrangement is arranged on the vehicle, the fastening element is fastened to bear against the support arrangement,
   wherein when the support arrangement is arranged on the vehicle, the vertical support is arranged upright on a vehicle floor of the vehicle,
   wherein the support arrangement is held on the vehicle chassis of the vehicle by the fastening element, and
   wherein when the support arrangement is arranged on the vehicle, the fastening element passes through the vehicle floor of the vehicle, starting from the rail of the vehicle chassis.

2. The device for arranging a passenger restraint system in a vehicle as claimed in claim 1, wherein the fastening element is a band.

3. The device for arranging a passenger restraint system in a vehicle as claimed in claim 1, wherein the fastening element arranged on the vehicle forms a U shape.

4. The device for arranging a passenger restraint system in a vehicle as claimed in claim 1, wherein the fastening element is fastened by at least one end to the vertical support and/or to the cross strut of the support arrangement.

5. The device for arranging a passenger restraint system in a vehicle as claimed in claim 1, wherein the fastening element is arranged on at least one lateral face of the vertical support, and wherein the lateral faces of the vertical support extend parallel to a direction of travel of the vehicle when the support arrangement is arranged on the vehicle.

6. The device for arranging a passenger restraint system in a vehicle as claimed in claim 1, wherein the support arrangement has two or more vertical supports, and wherein the fastening element is arranged by a first end on a first vertical support and by a second end on a second vertical support.

7. The device for arranging a passenger restraint system in a vehicle as claimed in claim 1, wherein, when the support arrangement is arranged on the vehicle, the fastening element is arranged with one end on the cross strut of the support arrangement, wherein the cross strut, as viewed in the vertical direction, is fastened to one or more vertical supports, beneath a mounting point of the support arrangement, perpendicularly in relation to an extent of the vehicle floor of the vehicle, and wherein the mounting point is provided for arranging a component of the passenger restraint system.

8. The device for arranging a passenger restraint system in a vehicle as claimed in claim 1, further comprising a tensioning mechanism for tensioning the support arrangement to the vehicle chassis via the fastening element when the support arrangement is arranged on the vehicle.

9. The device for arranging a passenger restraint system in a vehicle as claimed in claim 1, wherein the support arrangement, starting from a cross strut and/or a vertical support, has a support foot extending forward and downward,
   wherein the support foot supports the support arrangement, and
   wherein when arranged forward and downward on the vehicle floor of the vehicle, the support arrangement has a fastening member that connects the support foot to the remaining support arrangement in a region of the vehicle floor.

10. The device for arranging a passenger restraint system in a vehicle as claimed in claim 1, wherein the fastening member is in the form of a band.

11. A vehicle having a device for arranging a passenger restraint system as claimed in claim 1.

12. A vehicle having a device for arranging a passenger restraint system as claimed in claim 9, wherein a vehicle floor of the vehicle has a slot-type opening, through which the fastening element and/or the fastening member passes when the device is arranged on the vehicle.

13. The device for arranging a passenger restraint system as claimed in claim 4, wherein the fastening element is fastened by two ends to the vertical support and/or to the cross strut of the support arrangement.

* * * * *